United States Patent [19]

Herrlich

[11] Patent Number: 4,879,831
[45] Date of Patent: Nov. 14, 1989

[54] LIGHTING FISH LURE

[76] Inventor: Hermann H. Herrlich, 114 S. Cooliage Ave., Amityville, N.Y. 11701

[21] Appl. No.: 179,209
[22] Filed: Apr. 8, 1988
[51] Int. Cl.⁴ ............................................. A01K 85/01
[52] U.S. Cl. .................................... 43/17.6; 43/42.06; 43/42.09
[58] Field of Search .................... 43/17.5, 17.6, 42.06, 43/42.09, 42.33

[56]  References Cited
U.S. PATENT DOCUMENTS

| 4,581,839 | 4/1986 | Mattison | 43/17.6 |
| 4,589,221 | 5/1986 | Mattison | 43/17.6 |
| 4,610,103 | 9/1986 | Steinman | 43/17.6 |
| 4,672,766 | 6/1987 | Mattison | 43/17.6 |
| 4,709,999 | 12/1987 | Ottaviano | 43/17.6 |

FOREIGN PATENT DOCUMENTS 2232268 1/1975 France .................. 43/17.6

Primary Examiner—Richard K. Seidel
Assistant Examiner—William Scott Andes
Attorney, Agent, or Firm—Richard L. Miller

[57]  ABSTRACT

This lure is designed to hold chemical light emitting sticks for use particularly at night by fishermen, or even in murky water whether it be fresh or salt. Primarily, it consists of a transparent body with hooks and line attached, and an elongated opening is provided in the body that frictionally receives a light stick that may be removed easily by a simple tool, such as a scewdriver.

2 Claims, 1 Drawing Sheet

LIGHTING FISH LURE

BACKGROUND OF THE INVENTION

The instant invention relates generally to fishing tackle, and more particularly, to a lighting fish lure.

Numerous lures have been provided in the prior art that are adapted to be employed for night fishing and the like. For example, U.S. Pat. Nos. 4,638,584 of Lindsay, 4,589,221 of Mattison, and 4,610,103 of Steinman, all are illustrative of such prior art. While these units may be suitable for the particular purpose to which they address, they would not be as suitable for the purpose of the present invention as hereafter described.

SUMMARY OF THE INVENTION

A primary object of the present invention is to provide a light fishing lure that will overcome the shortcomings of the prior art devices.

Another object is to provide a light fishing lure that will be adaptable for employment by fishermen in fresh water or salt water at night or even in murky water.

An additional object is to provide a light fishing lure that will be so designed, as to attract fish from greater distances, and a "CYALUME" lighting element therein will be disposable after use.

A further object is to provide a light fishing lure that is simple and easy to use.

A still further object is to provide a light fishing lure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Figure 1:
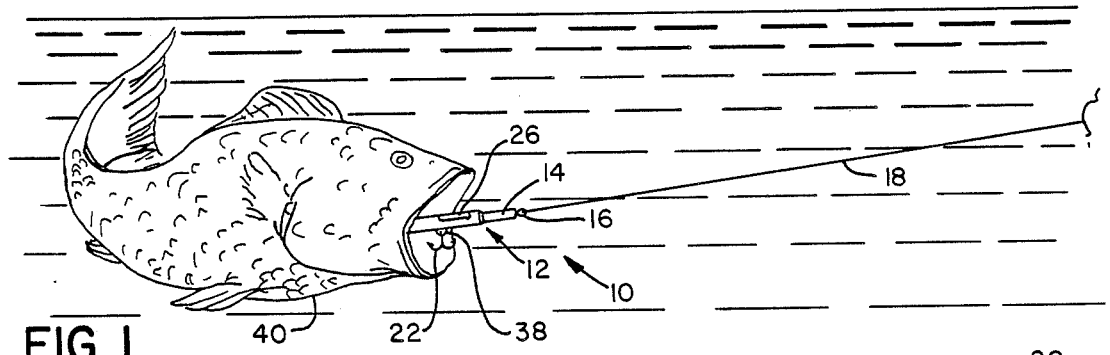
FIG. 1 is a side view of the instant invention in use.
Figure 2:
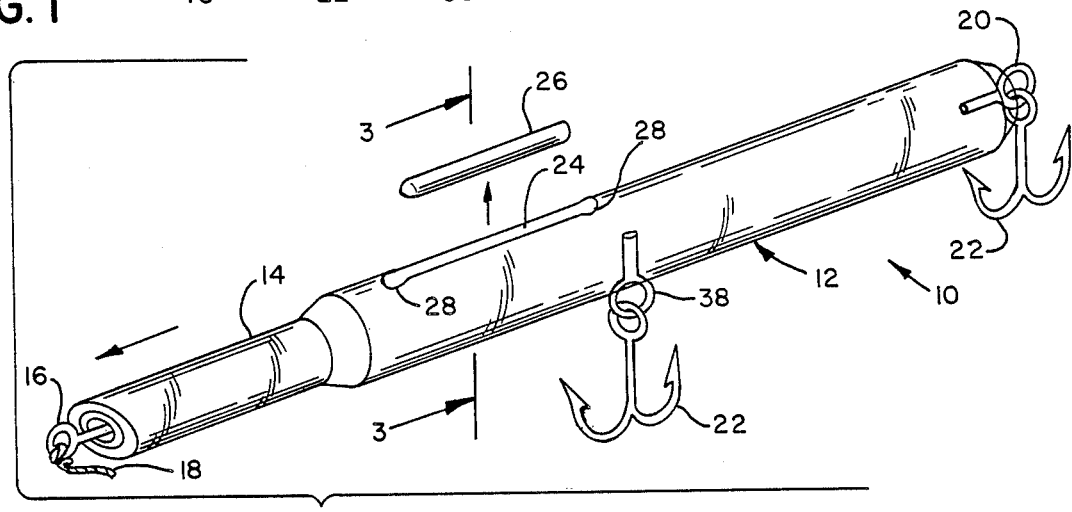
FIG. 2 is a perspective view of the instant invention showing the capsule after removal in phantom.
Figure 3:
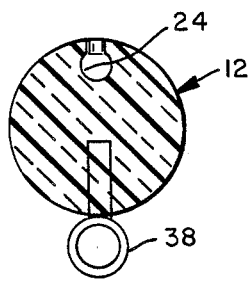
FIG. 3 is an enlarged cross sectional view, taken along line 3—3 of FIG. 2 shown with the capsule removed therefrom.
Figure 4:
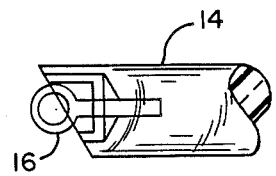
FIG. 4 is a fragmentary side elevational view of the towed end of the instant invention.
Figure 5:
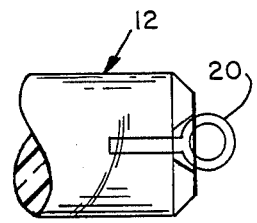
FIG. 5 is a similar view of the hook end.

Turning now descriptively to the drawings, in which like reference characters denote like elements throughout the several views, a lure 10 is shown to include a main body 12 of cylindrical configuration and fabricated of clear plastic. A small tail portion 14 is integrally attached to main body 12 and an eye 16 is fixedly secured in the end of tail portion 14 and removably receives a fishing line 18. A second eye 20 is fixedly secured in the rear end of main body 12 and freely and pivotally receives a treble hook 22, and a third eye 38 is fixedly secured in a substantially midway portion of lure 10, and also freely and pivotally receives a second treble hook 22. An elongated opening 24 is provided longitudinally in an outer periphery of main body 12, for removably receiving a commercially available chemical light stick 26 frictionally. Such light sticks 26 come in such colors as green, blue, red, and white.

The opening 24 is smaller at the open top portion and is terminated at the ends by larger dimensioned round portions 28, which enables a user to employ a narrow flat screwdriver or even better, a large cotter pin for prying under the end of a light stick 26 to force it out of the opening 24 after use.

In use, a preferred color light stick 26 is held between the thumb and index finger of the user, and is gently turned into the opening 24 more than half way. After the above, the user employs his thumb to press the light stick 26 in the opening 24 the rest of the way. It will then snap in place and will be retained therein, even when a most vicious fish 40 is on the line 18.

Figure 6:
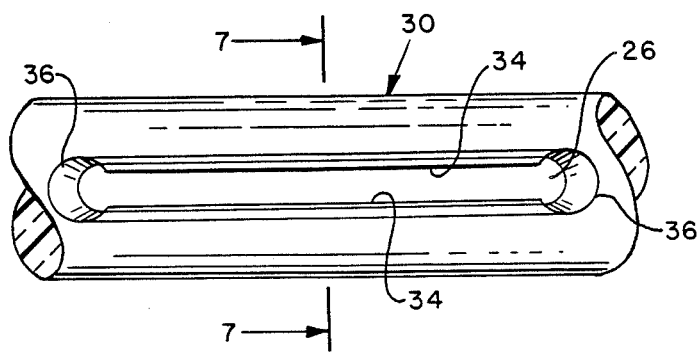
FIG. 6 is an enlarged fragmentary top plan view of the main body of the instant invention.
Figure 7:
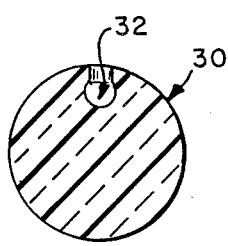
FIG. 7 is a cross sectional view taken on line 7—7 of FIG. 6.

Referring now to FIGS. 6 and 7, a modified main body 30 is provided with an elongated opening 32 of which the width dimension is constant, with the exception, that lip portions 34 extend inward at the top between the areas of the arcuate portions 36 at the ends thereof.

In use, a light stick 26 is inserted into opening 32 in the same manner as was heretofore described of main body 12, the only exception being, that the portions 36 enable a more angular approach of a screwdriver or other device to remove the light stick 26.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A lighted fish lure comprising:
   a substantially cylindrical main body of transparent material having a hook attached thereto for catching a fish; and
   a tubular cavity within said main body aligned along the longitudinal axis of said body for enclosing an elongated tubular light emitting stick whereby the light emitted from said stick will illuminate the main body, the diameter of said cavity being slightly larger than the diameter of said light emitting stick and the length of said cavity along its longitudinal axis being longer than the length of said light emitting stick, said cavity having a single opening thereto coextensive with the longitudinal extension of said light emitting stick and extending radially from said cavity to the exterior of said main body, said opening including a pair of opposing substrantially parallel walls spaced apart a distance approximately equivalent to the diameter of said light emitting stick and forming a snug channel through which the light emitting stick is inserted into and removed from said cavity, the longitudinally opposite ends of said opening beyond said channel being arcuate and slightly wider than the channel to provide access to a tool for removing said light emitting stick from said cavity.

2. A fish lure as in claim 1 in which the opposing walls of said channel diverge slightly proceeding from the outside of said main body toward said cavity so the distance between said walls is less at the outside of said main body than at the cavity end of said channel.

* * * * *